(12) United States Patent
Sommer et al.

(10) Patent No.: US 8,088,535 B2
(45) Date of Patent: Jan. 3, 2012

(54) BIPOLAR PLATE AND ITS USE, AS WELL AS A METHOD FOR ITS MANUFACTURE AND AN ELECTROCHEMICAL SYSTEM CONTAINING THE BIPOLAR PLATE

(75) Inventors: Stefan Sommer, Ulm (DE); Bernd Gaugler, Ulm (DE); Claudia Kunz, Ulm (DE); Raimund Ströbel, Ulm (DE); Christian Schleier, Günzburg (DE); Joachim Scherer, Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 1095 days.

(21) Appl. No.: 10/594,858

(22) PCT Filed: Mar. 29, 2005

(86) PCT No.: PCT/EP2005/003475
§ 371 (c)(1), (2), (4) Date: Sep. 29, 2006

(87) PCT Pub. No.: WO2005/096421
PCT Pub. Date: Oct. 13, 2005

(65) Prior Publication Data
US 2007/0207366 A1    Sep. 6, 2007

(30) Foreign Application Priority Data

Mar. 30, 2004   (DE) .................. 10 2004 016 318

(51) Int. Cl.
*H01M 8/04* (2006.01)
(52) U.S. Cl. ...................................... 429/514
(58) Field of Classification Search ........... 429/400–535
See application file for complete search history.

(56) References Cited

U.S. PATENT DOCUMENTS

| | | | |
|---|---|---|---|
| 5,863,671 | A | 1/1999 | Spear, Jr. et al. |
| 2002/0064702 | A1 | 5/2002 | Gibb |
| 2002/0168562 | A1* | 11/2002 | Funatsu et al. ................. 429/38 |
| 2003/0124405 | A1 | 7/2003 | Rock |
| 2003/0162078 | A1 | 8/2003 | Kikuchi et al. |
| 2003/0194595 | A1 | 10/2003 | Gibb et al. |
| 2006/0054664 | A1 | 3/2006 | Strobel et al. |

FOREIGN PATENT DOCUMENTS

| | | |
|---|---|---|
| DE | 100 15 360 A1 | 10/2001 |
| DE | 101 62 871 A1 | 7/2003 |
| DE | 102 21 951 A1 | 12/2003 |
| WO | WO 02/075893 A2 | 9/2002 |

* cited by examiner

*Primary Examiner* — Basia Ridley
*Assistant Examiner* — Jonathan G Leong
(74) *Attorney, Agent, or Firm* — Marshall & Melhorn, LLC

(57) ABSTRACT

The present invention relates to a bipolar plate (1) for electrochemical systems which contains a first plate (2) with a first flowfield (2a) for media distribution as well as a second plate (3) with a second flowfield (3a) for media distribution. This first plate in the region of the first flow field at least in regions comprises a plane surface section (4) from which discrete projections (5) distanced to one another project arranged in a distributed manner. Furthermore a method for manufacturing this bipolar plate is suggested as well as an electrochemical system which contains this bipolar plate. According to the invention it is possible in an inexpensive manner to manufacture a bipolar plate which permits the construction of fuel cells functioning with a low peripheral consumption (pumps, compressors) and which are safer with regard to their operation.

20 Claims, 4 Drawing Sheets

Figure 1:
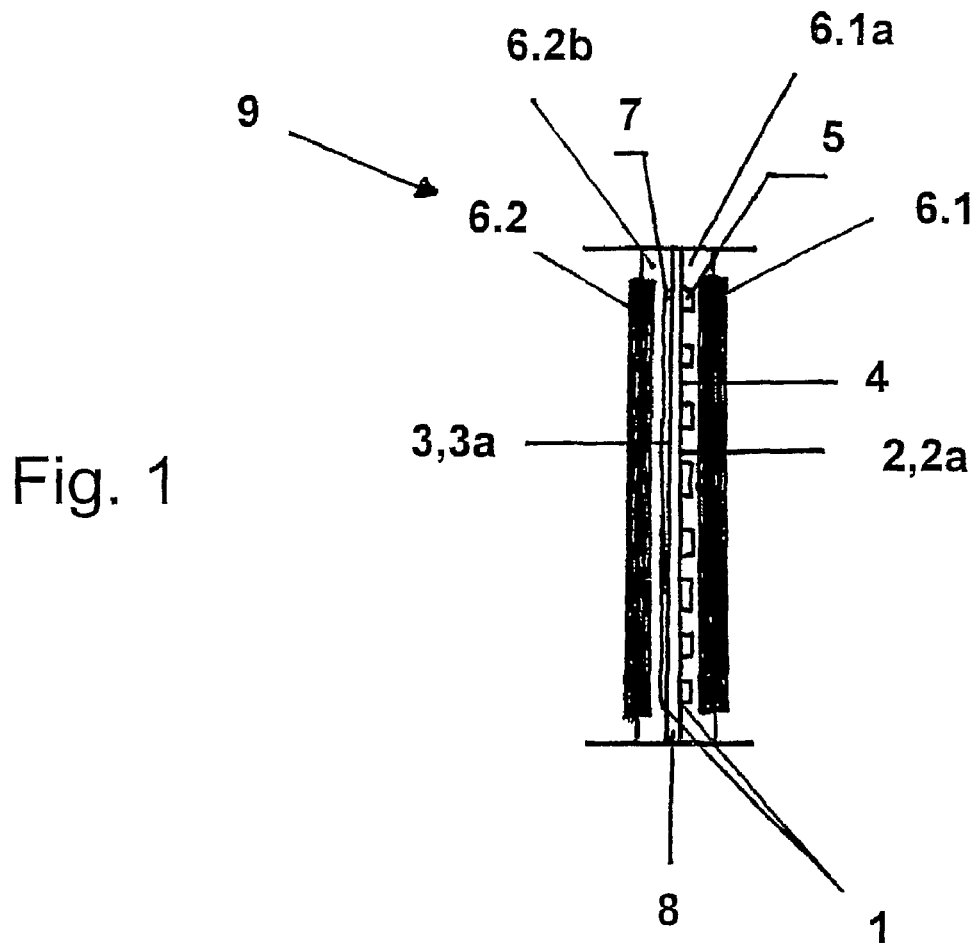

BIPOLAR PLATE AND ITS USE, AS WELL AS A METHOD FOR ITS MANUFACTURE AND AN ELECTROCHEMICAL SYSTEM CONTAINING THE BIPOLAR PLATE

The present invention relates to a bipolar plate, to a method for its manufacture as well as to an electrochemical system containing the bipolar plate, as for example a fuel cell system or an electro-chemical compressor system.

Electrochemical compressor systems may e.g. be electrolysers which by way of applying a potential, apart from producing e.g. hydrogen and oxygen from water also simultaneously compress these under pressure.

Apart from these, electrochemical compressor systems are also known such as e.g. electrochemical hydrogen compressors to which gaseous molecular hydrogen is supplied, and this is electrochemically compressed by way of applying a potential. This electrochemical compressing particularly lends itself for low quantities of hydrogen to be compressed since a mechanical compression of the hydrogen here would be significantly more complex.

Electrochemical systems are known with which an electrochemical cell stack is constructed with a layering of several electrochemical cells which in each case are separated from one another by way of bipolar plates. At the same time, the bipolar plates have several tasks:
- to electrically contact the electrodes of the individual electrochemical cells, e.g. fuel cells, and to lead the current further to the adjacent cell (series connection of the cells),
- to supply the cells with media, e.g. reaction gases, and to lead away reaction products via a gas distribution structure (flowfield),
- to lead away the waste heat which arises on production in the electrochemical cells, as well as
- to mutually seal the various media channels and cooling channels, mutually and to the outside.

For the supply and removal of media from the bipolar plates to the actual electrochemical cells, wherein these e.g. are MEAs (membrane electrode assemblies, i.e. membrane electrode units) with a gas diffusion layer (e.g. of a metal or carbon nonwoven) which in each case is orientated towards the bipolar plates, the bipolar plates may have openings for cooling or for the supply and removal of media.

In known fuel cells systems, the gas distribution is effected along the MEA by way of channel and meander structures on both sides of the bipolar plate. The design of the channel structures at the same time is chiefly directed to an optimisation of the gas distribution on the side facing the MEA. Above all with metallic bipolar plates, from this arises the problem that the distribution and leading of the cooling water between the individual plates results only in the cavities arising there by way of connection, as a consequence of the embossed channel structures of the gas distribution regions. A targeted distribution/leading of the cooling water by way of this is not ensured in very case. Furthermore the operational safety of fuel cell systems may also be compromised due to the fact that fine channel structures, e.g. by way of forming water, become blocked and thus the leading e.g. of gaseous media is prevented so that the efficiency e.g. of the fuel cell system is reduced.

Furthermore, on account of the channel structures of known bipolar plates, which in part are quite complex, one requires extensive embossing tools for their manufacture.

The prior-published US 2003/0162078A1 shows a fuel cell arrangement with a bipolar plate of the generic type for electrochemical systems which contains a first plate with a first flowfield for distribution of media as well as a second plate with a second flowfield for the distribution of media, wherein the first plate in the region of the first flow field at least in regions comprises a plane surface section from which discrete projections which are distanced from one another and which are arranged in a distributed manner project.

It is therefore the object of the present invention to provide an electrochemical system containing a bipolar plate, or a method for its manufacture, wherein in comparison to the state of the art, advantages with regard to inexpensive manufacturing ability and operational safety are to be accomplished, and in particular, a simple and safe supply of coolant is to be achieved.

This object is achieved by way of the subject-matter of the independent claims, specifically a bipolar plate according to the invention, its use according to the invention, and a method for its manufacture according to the invention or an electrochemical system according to the invention.

The bipolar plate according to the invention for electrochemical systems comprises a first plate with a first flowfield for the distribution of media and a second plate with a second flowfield for the distribution of media. With this, the first plate in the region of the first flowfield at least in regions has a plane surface section from which linear or discrete projections which are distanced from one another and which are arranged in a distributed manner project.

This applies at least to the first plate, but of course these projections according to the invention are also simultaneously possible for the first and second plate. It is advantageous for such a bipolar plate to be manufactured in that firstly the first as well as the second plate which preferably consist of a sheet metal are provided with projections and/or channel structures by way of inexpensive manufacturing methods such as roller embossing, punching, hydroforming, eddy current embossing etc., and subsequently the first and the second plate on the sides which are opposite to the channel structures and/or projections are connected to one another or joined by way of the methods of soldering, bonding or laser beam welding.

This permits an inexpensive manufacturing ability, in particular for high-volume operation, and discrete projections which are distanced to one another, project from a plane surface section and are distributed over the surface or in a uniform manner may be manufactured in a particularly simple manner. Thus with simple embossing methods these as a rule may be manufactured in a single cycle (run) since no shaping procedures which are complicated and are expensive with regard to material need to be accomplished, as for example is the case with the manufacture of U-shaped channel structures or with the manufacture of complicated meandering structures.

The subject-matter of the invention is thus a metallic bipolar plate for fuel cells of two embossed plates of which at least one plate may have a punched structure; the other on the other hand e.g. may also have a straight-line channel structure. By way of connecting the two plates into a bipolar plate, a channel system for a cooling medium arises between the plates, and on the outer surfaces in each case a structure for distributing the reaction gases, which is adapted to the gas flows in the fuel cell. This arrangement is particularly suitable for fuel cell systems with a low operating pressure as well as for fuel cell stacks with which the air supply of the cells is effected outside the actual stack (so-called external air supply or so-called "self-breathers"). The embossing of the plates is simplified by way of the application of simple, repetitive structures. The adaptation of the distributor structure to different sizes and shapes of plate is simple and possible within large ranges.

A particularly advantageous aspect of the invention lies in the fact that by way of the combination of projections on the first plate or channel structures on the second plate (or also combinations of projections on the first and second plate) a cavity may be designed between the first and the second plate, so that here a targeted leading of the coolant is possible without having to negatively influence the channel characteristics of the flowfield.

For this, the invention envisages the second plate comprising the channel structures and the projections on the first plate as well as the channel structures on the second plate being arranged in a manner such that a cavity for introducing coolant is formed between the first and the second plate, said cavity e.g. being arranged at a through-opening of a fuel cell stack which for example runs perpendicular to the plate planes of the fuel cell stack.

With this, it is particularly advantageous for the projections on the first plate and the corresponding channel structures on the second plate to be designed such that the projections form a cross-over (connecting passage) of cooling fluid from a first channel of the channel structure to a second channel of the channel structure. This for example is the case if regions which are unconnected to one another, e.g. grooves lying next to one another, are formed on the second plate, which are not connected to one another in a fluid-conducting manner. Here, by way of the joining of the first plate to the second, it occurs that the projections form quasi "bridges" or a cross-over (connection) from e.g. one groove to an adjacent groove. I.e., that the cooling fluid crosses [over] the middle of the plane of the plate when it, by way of the projections, changes from a first cavity of a first groove into the cavity of the second groove, crossing this middle of the plate plane.

As such quasi infinite coolant flow paths may be predetermined without this having to result in a complicated media distributor structure prone to fail, on the flowfield on the fuel cell side.

By way of the suggested simplification of the distributor structures to repetitive, simple geometric shapes, the manufacture of metallic bipolar plates is to be simplified (e.g. by way of roller embossing). It is also conceivable for the flowfield to be produced by several embossing steps with which the tool is offset and multiple identical structures are reproduced on the plate. Furthermore a possibility it to be found by way of which the coolant flow within the plate may be designed in a more homogeneous and variable manner.

The system is preferably designed as a low pressure system, i.e. for the supply of gas flows one does not require a gas compressing (compacting) which is energy-intensive, since the reaction gases close to atmospheric pressure are led through the stack with fans or pumps having a low power. Due to the low power requirements for the periphery of the stack, such a system is of particular interest for mobile applications since here a high net output of the whole system is decisive. By way of the skilful combination of e.g. H-punch designs and channel structure on the respective sides of the bipolar plate, one may carry out a defined distribution of the coolant by way of which a homogeneous removal of heat is rendered possible. It has been shown that a uniform cooling is decisive for a reliable and high output of the fuel cell. The combination of punch and channel structure suggested here permits a large scope for play in the design of the leading of the coolant. The cooling water which is distributed in the straight-lined channels (rear side of the cathode plate) in the transverse direction is led further to the next straight-lined channel in the longitudinal direction via the connection webs of the e.g. H-punch (rear side of the anode plate). By way of the targeted arrangement of the H-punch on the anode plate therefore one may optimally guide the coolant flow along the bipolar plate, adapted to the requirements of the fuel cell.

A multitude of advantages result by way of the use of simple geometric shapes as gas distribution structures, and these advantages simplify the manufacturability of the bipolar plates or help in increasing the output capability of the fuel cell.

The flowfield in large regions may be adapted to the size and shape of the bipolar plate by way of the simple, repetitive distribution structures. The most various of punch shapes are conceivable. At the same time the punches apart from their shape may also be adapted to the requirements in the cell with regard to their height structure.

The recurring structures are well suitable for continuous embossing methods (e.g. roller embossing) since the material indent on embossing is low and at the same time is effected uniformly. Furthermore the structures may be easily [re-] shaped since tight windings may be avoided (U-turns).

In particular the punch structures create an increased stiffness of the gas distribution structures, by which means a pressing-together of the gas distributors given a high stack pressing is avoided. Furthermore the uniformly and variably distributable structures permit an adaptation to the required pressing of the active regions (MEA) of the fuel cell, by which means the transition resistances between the components may be minimised. Furthermore by way of the variability of the punch structures, the contact points between the two individual plates may be adapted with respect to the position and distribution, by which means the joining of the two plates into a bipolar plate is significantly simplified, and finally the bipolar plate may be optimised with respect to stability and contact resistance between the plates.

By way of incorporating orthogonally arranged transverse channels of a small height between the longitudinal channels of the cathode side, one may incorporated "flow interrupters" into the air channels, by which means the output of the air electrode is increased. Thus however further possibilities of leading the coolant in the inside of the bipolar plate result.

The combination of punch and channel structure suggested here is above all suitable for systems which are to operate with low fuel gas pressures. The gas channels or possible gas paths which are present in multiple on the anode as well as the cathode lead to a low susceptibility with respect to an accumulation of condensed water on the electrode. In particular the punch flowfield is suitable for fuel cells which are operated without continuous hydrogen flow-through (systems with a very high $H_2$ conversion, e.g.>90-95%). The simple linear channel system on the cathode permits the supply of the stack from the outside (so-called external air supply or manifold) by way of fans or blowers. By way of the replacement of the pumps and compressors which are otherwise required with internal air supply, the consumption of the stack periphery may be significantly reduced and the total of efficiency of the system may be increased.

Advantageous further formations are specified in the dependent claims.

One advantageous embodiment of the bipolar plate according to the invention envisages the first plate to comprise projections for distributing a fuel medium such as for example molecular hydrogen on the anode side of a fuel cell, and the second plate of the bipolar plate to comprise channels for distributing media such as for example air or oxygen on the cathode side of the bipolar plate. On the anode side it is particularly the formation of discrete structures which offers the advantage that e.g. more than 90-95% of the introduced hydrogen is actually consumed. Firstly by way of the discrete structures which permit several flow directions and thus a large-surfaced distribution, a clogging of the structure e.g. by way of fluid accumulation may be avoided. Furthermore by way of the fact that the hydrogen is practically completely consumed and no unconsumed hydrogen needs to be led away, a so-called "dead-end" arrangement may be constructed which merely prepares a supply for the hydrogen but which does not require a return etc. for the hydrogen.

One further advantageous embodiment of the bipolar plate envisages the second plate likewise comprising channel structures, wherein these at least in regions are formed linearly or in a channel-like manner. Thus e.g. it becomes possible to design a multitude of grooves lying parallel and individually next to one another, which do not create a complex, e.g. meandering structure, but individual channels lying next to one another and separate from one another. The channel structures at the same time may also have height differences, i.e. that the depth of the channel structures is different or the extent of the projection of the channel structures perpendicular to the smooth plane is different. Thus preferably standard heights in the range of constant 0.3 to 0.7 mm beyond the plane of the plate may arise (this measure relates to the largest height of the channel structures with respect to the non-deformed plane plate). Here however variations in height may be possible in order e.g. to create "flow interrupters" and as a whole a supply of the fuel cells with operating media which is over an as large as possible surface and which is uniform becomes possible.

The projections according to the invention, which project from a plane surface section of a plate of the bipolar plate, may have different shapes. Thus it is possible for these projections in a plan view of the plane of the plate to have the shape of a C, of an I, of a U, of an L, of an H, of an X, of a V or e.g. of an O. Here it is the case of structures which may be easily represented, are composed of simple strokes and which with regard to manufacturing technology may be easily manufactured. It is preferably such that projections of the same type which discretely project from the surface section are essentially distributed uniformly over the plane surface section. Thus e.g. on a previously pure plane surface of 100 $cm^2$, after the embossing of the projections which are distanced discretely from one another, for example 150 to 220 projections are incorporated, wherein of the original 100 $cm^2$, 18 to 25 $cm^2$ are covered by projections and the remaining area exhibits a pure plane surface section.

Here it is favourable that the projections with regard to their highest extension, i.e. perpendicular to the plate planes, the furthest distanced surfaces with respect to the surface of the plane surface section, have a height of 0.3 to 0.7 mm, preferably 0.4 to 0.6 mm. At the same time it is of course also possible for the projections in turn to have height differences. By way of this and by way of the slightly reduced projections it is possible here that the effective contact surface here e.g. towards the polymer electrolyte membrane of the fuel cell is increased or for a flow interruption in the flowfield to take place which likewise serves for an improved exploitation of the media.

It is advantageously possible for the projections on the first plate and the corresponding channel structures on the second plate to be designed such that one or more cooling circuits are formed in the hollow space for introducing cooling fluid. Thus e.g. it is possible to connect parts of the channel structure or the entirety of the channel structures into a large cooling circuit by way of a suitable connecting passage by way of projections on the first plates. It is moreover possible to provide individual different coolant regions or to design meandering cooling circuits interlaced within them.

It is particularly advantageous for the bipolar plate according to the invention for the bipolar plate to be of a metallic material such as steel, stainless steel, nickel, aluminium or titanium, wherein for reasons of costs for example corrosion-free sheet steel lends itself. In the condition of the bipolar plate being ready installed, here the first or the second plate in each case has a thickness of 0.1 to 0.6 mm, preferably 0.075 to 0.3 mm.

It is simply possible to provide this first and second plate with projections or channel structures by way of embossing, punching, hydroforming or eddy current embossing, and subsequently to connect the first and second plate to one another.

The possible uses of the plate according to the invention are specified by way of example in the use claim. Thus the plate as a "media distribution plate" lends itself for the most varied of electrochemical systems such as electrochemical compressors, but also for fuel cell systems, even for high temperature fuel cell systems. The specific use of the term "bipolar plate" is not absolutely compelling. Thus it is not absolutely necessary for all uses indeed for different electrical poles to be given at the two large surfaces of the bipolar plate which point away from one another. Thus it may so to speak be the case of a monopolar plate. A particularly useful and far-reaching application however would always be the field of low-pressure polymer electrolyte membrane fuel cells.

Thus for example the system according to the invention envisages this to be a polymer electrolyte membrane system with at least one fuel cell, wherein this at least one fuel cell consists of an electrolyte membrane which preferably has gas diffusion layers on both sides, on whose side distant to the polymer electrolyte membrane, flowfields of bipolar plates are arranged.

This fuel cell may for example be designed in a self-breathing manner with surrounding air, for example on the cathode side. Additional ventilation such as by way of a blower may also be effected. On the anode side of the fuel cell on which preferably the projections according to the invention are arranged, it is likewise the question of an inexpensive and "self-regulating" manner for the consumption of molecular hydrogen, since this is led via one or more supply conduits into the electrochemically active region of the fuel cell, but on account of the relatively favourable exploitation of this combustion gas it is not necessary to lead away uncombusted $H_2$. Thus it is also possible to provide the above described "dead-end" design. The advantage of a correspondingly constructed fuel cell is the relatively low operating pressure, the absence of complicated control electronics and a higher $H_2$ conversion. At the same time the efficiency of the fuel cell system is further increased by way of the inventive leading of the coolant.

Further advantageous embodiments are specified in the remaining dependent claims. The invention is now explained by way of several figures. There are shown in FIG. 1 an electrochemical system according to the invention, FIG. 2 a series of various possible shapes for the projections according to the invention, FIGS. 3a and 3b plan views of the first and second plate of a bipolar plate, FIGS. 4a and 4b possible flow paths of coolant in a bipolar plate according to the invention.

FIG. 1 shows an electrochemical system according to the invention with the example of a fuel cell system. This comprises a first fuel cell 6.1 as well as a second fuel cell 6.2 which is separated from this by way of a bipolar plate 1. The fuel cells 6.1 and 6.2 here consist of a centrally arranged polymer electrolyte membrane (e.g. obtainable under the trade name NAFION of the company DuPont) which mostly is covered on both sides with a gas diffusion layer. In each case an anode side of the fuel cell is shown on left side of the membrane, (e.g. 6.1*a* for the fuel cell 6.1), and one cathode side is shown on the right side (e.g. 6.2*b* for the fuel cell 6.2).

A bipolar plate 1 according to the invention is provided between the fuel cells 6.1 and 6.2. This consists of a first plate 2 as well as of a second plate 3. The first plate 2 has a first flow field 2*a* and the second plate 3 has a second flowfield 3*a*. These flowfields are suitable for distribution of media, particularly for distributing gaseous media on the anode or cathode side. The first flowfield 2*a* here ensures that an as uniform as possible distribution of molecular hydrogen to the adjacent fuel cell 6.1 is effected on the anode side 6.1*a*, wherein this fuel cell is designed as a so-called "dead-end" system which on the anode side 6.1*a* only contains supply conduits but no return conduits for unused gaseous hydrogen.

Here the flowfield extends over the electrochemically active surface of the fuel cell 6.1 so that here a uniform distribution of media of the medium applied here (molecular hydrogen) is effected.

The cathode side 6.2*b* of the fuel cell 6.2 is shown on the oppositely lying side of the fuel cell of the bipolar plate 1. Here too the flowfield extends over the electrochemically active region of the fuel cell 6.2. On the cathode side however the space is not closed to the surroundings in a gas-tight manner. Here it is the case of a "self-breathing" fuel cell which obtains its oxygen itself from the surrounding air. It is of course possible to achieve an increase of the air throughput additionally by way of a blower. As a whole it may be ascertained that the system shown here, which operates with low pressure, on the one hand has a high efficiency and on the other hand is to be operated with a low expense with regard to control technology, and in an operationally secure manner. The efficiency of the fuel cell system may here be increased even further in that the introduction of cooling fluid is effected in a cavity 8 which is incorporated between the first plate 2 and the second plate 3, said cooling fluid reducing the operating temperature of the fuel cells and thus increasing the energy efficiency.

The bipolar plate 1 is once again explained in more detail. Here it is the case of a bipolar plate 1 for electrochemical systems, which contains a first plate 2 with a first flowfield 2*a* for media distribution as well as a second 3 with a flowfield 3*a* for media distribution, wherein the first in the region of the first flowfield at least in regions has a plane surface section 4 from which discrete projections 5 distanced to one another project arranged in a distributed manner.

Here it is the case of a polymer electrolyte membrane system with at least one fuel cell (6.1), wherein this at least one fuel cell consists of an electrolyte membrane which preferably has gas diffusion layers on both sides, on whose side distant to the polymer electrolyte membrane (PEM) the flowfields of at least one bipolar plate are arranged.

Figure 2:
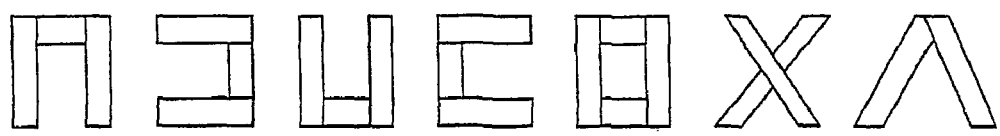

FIG. 2 shows various embodiments of possible projections which extend distributed in a surfaced manner surface on the flowfield 2*a* discretely and distanced to one another. These have the shape for example of a "U" which may be open towards various directions (see the four first example profiles from the left). An "O"-shaped structure is subsequent to this fifth from the left, finally and "X"-shaped one and completely to the right a "V"-shaped one.

These projections here may each be easily manufactured since here it is the case of structures constructed from "rod shapes". The rods shown in FIG. 2 may also each have different heights. By way of this the gas flow to the electrode arranged on the anode side is simplified. Of course the examples for the projections shown in FIG. 2 are not conclusive. The projections may be designed e.g. C-shaped, I-shaped or L-shaped or comprise other simple geometric structures.

Figure 3A:
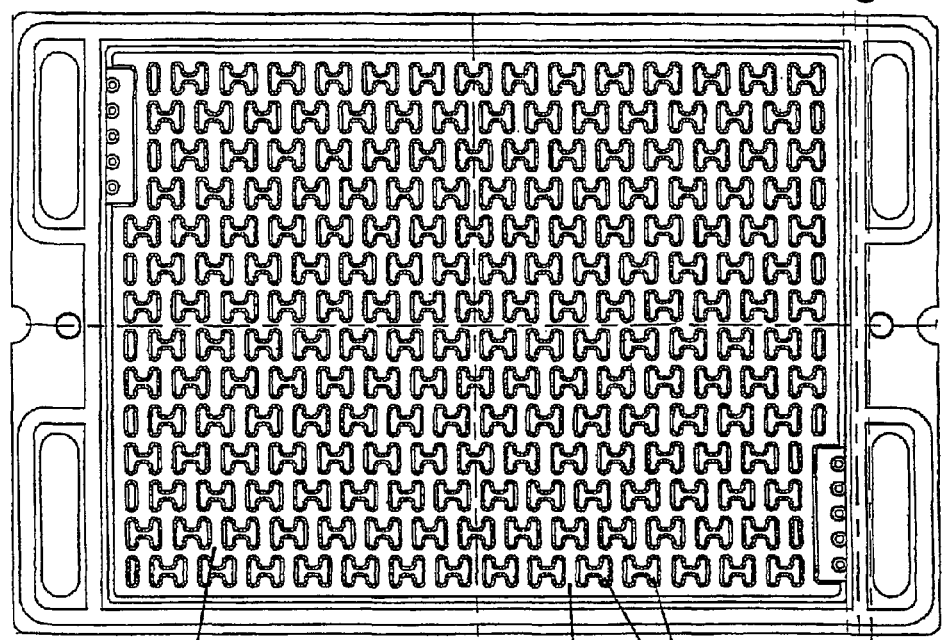
Figure 3B:
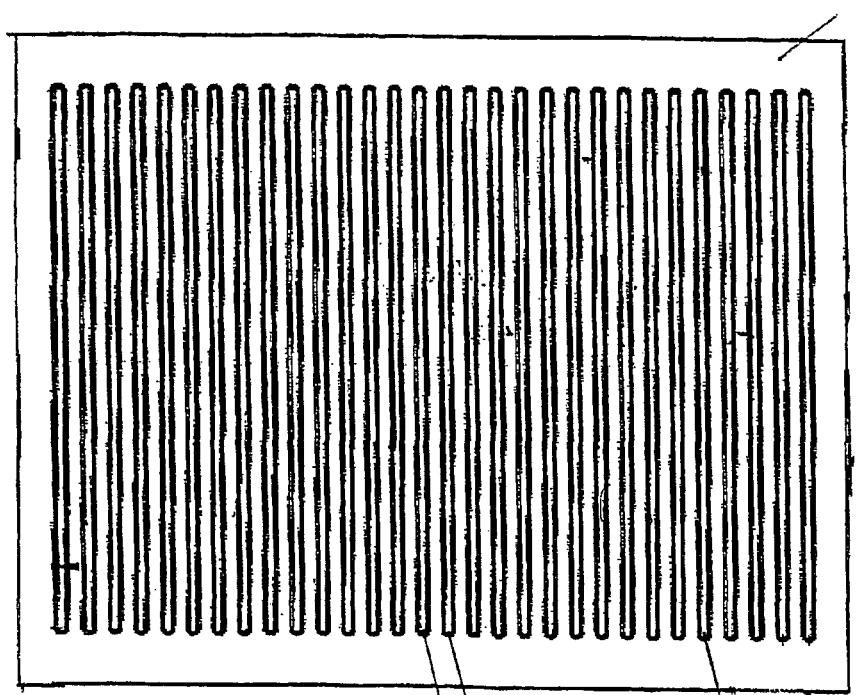

FIGS. 3*a* and 3*b* in each case show plan views of a bipolar plate 1 according to the invention.

With this (FIG. 3*a*), the outer side (i.e. the side facing the anode side) of the first plate 2 is shown in the plan view. This plate 2 in the edge region comprises a seal which is not shown in more detail as well as, at the corners, in each case with an elongate hole shape, interface channels for passage of media. Centrally, a flowfield 2*a* is shown, which extends over the surface of the electrochemically active region of the fuel cell 6.1 in an essentially rectangular manner. The supply conduit of a fuel gas such as e.g. molecular hydrogen is effected via gas supply openings which are shown at the top left or at the bottom right. The flowfield 2*a* is designed essentially as a plane surface section 4 from which discrete projections 5 distanced to one another project arranged distributed over a large surface. These discrete projections are arranged at a regular distance to one another and have essentially the shape of the letter "H". Approx. 200 projections are given on 100 cm$^2$ of surface of the flowfield. The minimum distance of these projections is preferably between 0.5 mm and 3 mm. The surface of the flowfield covered by projections (this is to be understood as surface at which already the smallest of projections exist, thus everything which does not belong to the plane surface section) here is 20% to 40% preferably 20 to 25% of the total area of the flowfield.

The projections projecting out of the plane of the sheet, proceeding from the plane surface section 4 have a maximal height at their uppermost location of 0.3 to 0.7 mm, preferably 0.4 to 0.6 mm.

FIG. 3*b* shows a second plate 3 which comprises channel structures 7. These channel structures 7 are designed as straight-lined channels lying next to one another and which are unconnected to one another. Here it is the case of quasi groove-like formations lying next to one another. These channel structures which normally project 0.3 to 0.7 mm with respect to the plane base (i.e. the flat surface of the second plate, 0.3 to 0.7 is preferably the normal height here) may also have different heights.

The first and second plates shown in FIGS. 3*a* and 3*b* are rigidly connected to one another at their sides distant to the projections or channel structures. The first and second plate at the same time are each designed of sheet steel. The thickness of the first or second plate in the flat unshaped section is 0.1 to 0.2 mm. The first and second plate here have been manufactured by roller embossing or punching from a flat sheet steel, and subsequently a joining of the first and second plate on the sides opposite to the channel structures or projections was effected preferably by way of soldering, bonding or laser beam welding etc.

Figure 4A:
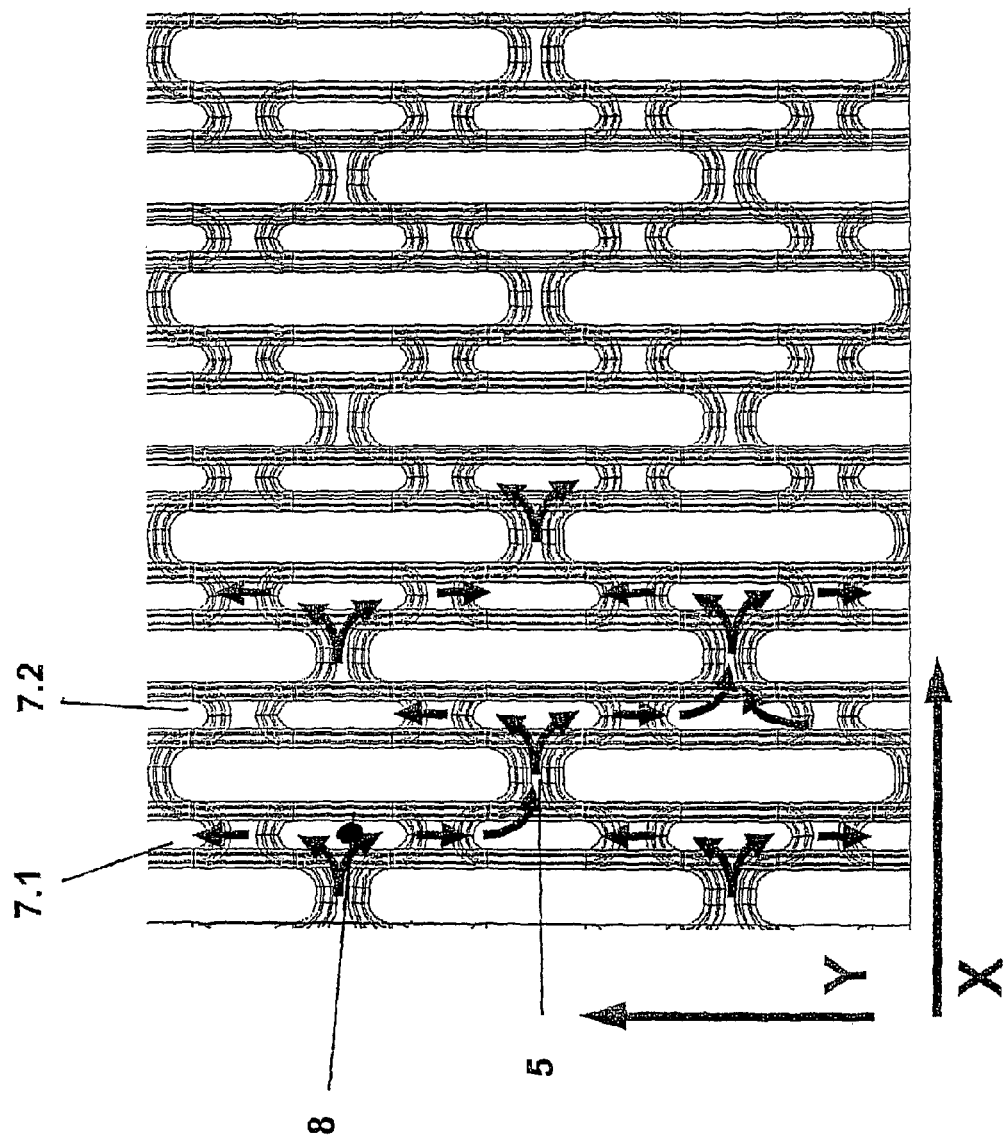
Figure 4B:
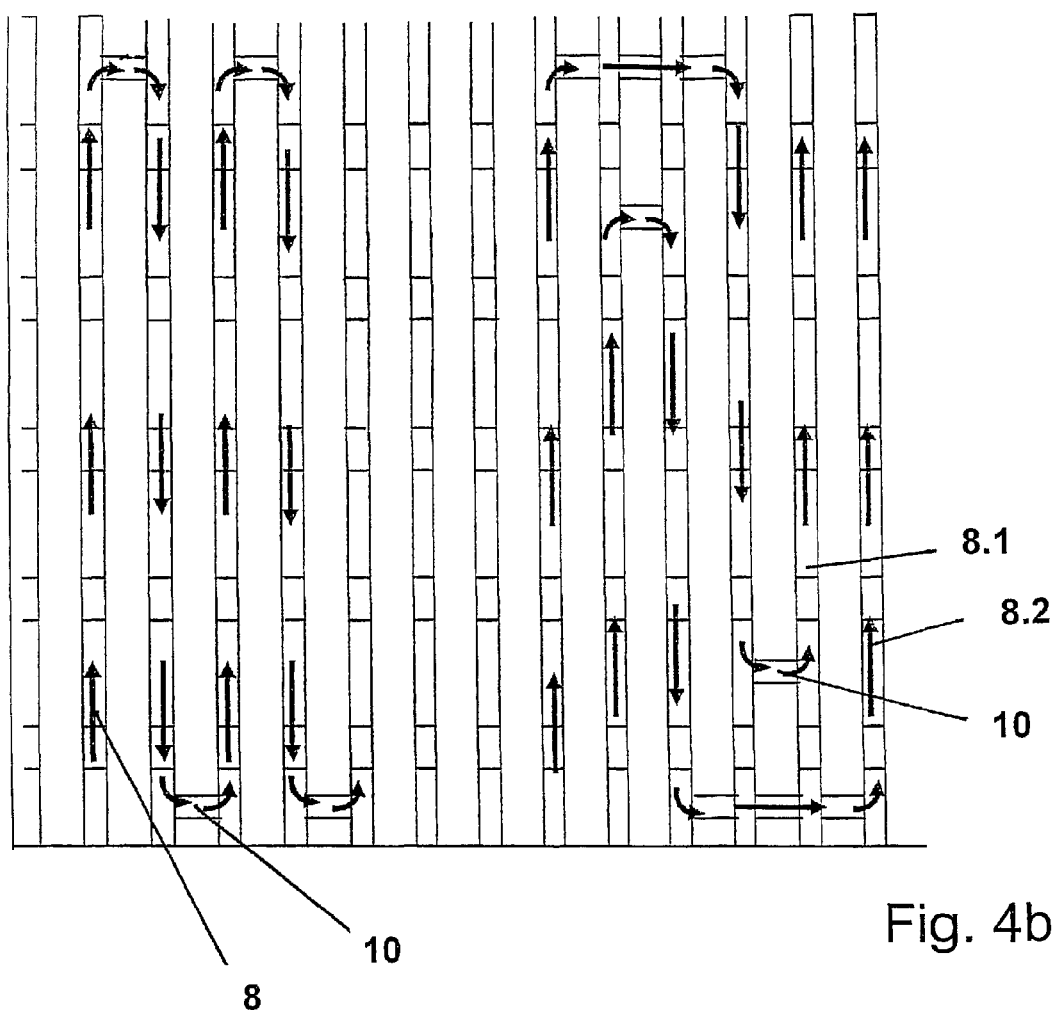

FIGS. 4*a* and 4*b* show details of the cavity 8 which is formed between the first plate 2 and the second plate 3 and which represents a closed cavity for leading a cooling fluid for cooling the bipolar plate 1. Here thus the second plate 3 comprises channel structures 7, and the projections 5 on the first plate as well as the channel structures 7 on the second plate are arranged in a manner such that a cavity is formed between the first 2 and the second 3 plate for introducing cooling fluid.

Here FIGS. 4*a* and 4*b* show a "through-view" through the bipolar plate 1, somewhat in the context of an X-ray picture, wherein the possible flow paths in the indicated cavities are in each case indicted with arrows.

Here FIG. 4a shows the flow paths with a bipolar plate 1 which comprise plates according to FIGS. 3a and 3b. Here the first plate comprises "H"-shaped sections shown in FIG. 3a, wherein the second plate (see FIG. 3b) comprises groove-like sections lying next to one another, thus e.g. a first groove-like channel 7.1 and a second groove-like channel 7.2. Here the perpendicular members of the "H" are distanced to one another by the same distance as the first channel 7.1 or the second channel 7.2, so that the position shown in FIG. 4a partly overlap. By way of this it becomes possible for fluid led in the first channel 7.1 to be led via the transverse member of the "H" in the first channel 7.1 into the second 7.2 without exiting from the cavity 8. With the arrangement shown in FIG. 4a, it is thus possible to distribute the fluid in the cavity 8 of the bipolar plate 1 over quite a large space and in a uniform manner. By way of the targeted arrangement of the H-punches on the anode plate thus in a simple manner the coolant flow may, adapted to the requirements of the fuel cell, be led along the bipolar plate in an optimised manner in the X or Y-direction.

Here therefore it is the case of a bipolar plate, wherein the projections 5 on the first plate 2 and corresponding channel structures 7 on the second plate 3 are designed such that the projections 5 form a connecting passage of cooling fluid from a first channel 7.1 of the channel structure to a second channel 7.2 of the channel structure.

Finally FIG. 4b shows a further embodiment of the shaping of the cavity of a bipolar plate according to the invention. Here a meandering leading of the coolant is shown in FIG. 4b on the left side. For this, again groove-like channels lying next to one another are shown (which also have height variations for interrupting the flow), which are connected to one another at sporadic locations by way of connection webs 10 (the connection webs 10 here are formed by "I"-shaped projections 5 on the first plate 2). On the left side in FIG. 4b, here a meandering leading of coolant is shown, wherein a single meander structure is given which forms a cavity 8 which in its entirely is closed.

A further possibility is shown in FIG. 4b on the right side. Here by way of another arrangement of the projections 5 which e.g. are designed as "I" shaped projections 10, another manner of leading the coolant is rendered possible. Here, two meander structures are formed which show separate cooling circuits. Thus 8.1 shows a cooling circuit which is separate from 8.2, wherein these in turn may be interlaced in one another.

Thus here a bipolar plate is shown, wherein the projections on the first plate 2 and the corresponding channel structures 7 on the second plate 3 are designed such that one or more cooling circuits 8.1, 8.2 are formed in the cavity for introducing cooling fluid.

A further considerable advantage of the bipolar plate according to the invention for electrochemical systems which contains a first plate with a first flowfield for media distribution as well as a second plate with a second flowfield for media distribution, wherein the first plate in the region of the first flowfield at least in regions comprises a plane surface section, from which discrete projections which are distanced to one another project arranged in a distributed manner, is the fact that these projections may be designed projecting purely from one side. By way of this it is possible to use particularly simple and inexpensively manufacturing embossing dies for the individual plates, which are also simple in handling, since as is not the case with plates embossed on both sides—with a flat mounting of the plate in any case one projection needs to be loaded, but the plates may be deposited on the "stable" flat side.

By way of embossing in each case in one direction, the thinnest possible bipolar plate is achieved with an equal functionality. Furthermore by way of the embossing in only one direction one thus creates a bipolar plate which is as thin as possible and thus a saving in volume without influencing the functional safety.

The invention claimed is:

1. A separator for electrochemical systems, comprising:
 a first conductive plate having a face and defining a plane; and
 a second conductive plate having a face;
 wherein each plate includes a series of projections extending outwardly therefrom; wherein each of the projections have a corresponding cavity defined on the opposite side thereof in the face of the respective plate;
 wherein when the faces of the first and second plates are brought into an overlapping relationship facing one another, at least a subset of the cavities of the first plate engage a subset of the cavities of the second plate to provide at least one flow path between the first plate and the second plate;
 wherein the cavities of the first plate are dissimilar in shape from the cavities of the second plate;
 wherein the cavities on the first plate are discrete and spaced from one another in a distributed manner over the face of the first plate defining a region having a periphery, such that the cavities on the face of the first plate form no continuous channel entirely within the plane of the first plate and linking one edge of the periphery of the region of the face of the first plate with another edge of the periphery of the region of the face of the first plate; and
 wherein the cavities on the second plate form at least one connecting passage between discrete and spaced apart cavities on the first plate.

2. The separator of claim 1 wherein the cavities of the second plate comprise a plurality of generally parallel channels.

3. The separator of claim 1 wherein the at least one flow path between the first plate and the second plate defines at least one flow path for cooling fluid.

4. The separator of claim 1 wherein at least one of the projections of the first plate and the projections of the second plate define a flow path for media distribution.

5. The separator of claim 4 wherein the projections of the first plate define a flow path for distributing a fuel medium on the anode side of a fuel cell.

6. The separator of claim 4 wherein the projections of the second plate define a flow path for distributing a medium on the cathode side of a fuel cell.

7. The separator of claim 6 wherein the medium is one of air and oxygen.

8. The separator of claim 1 wherein the first plate is in contact with and connected to the second plate.

9. The separator of claim 1, wherein the cavities of the second plate extend linearly and lay next to each other.

10. A method of manufacturing a separator for electrochemical systems comprising: providing a first conductive plate having a face and defining a plane and a second conductive plate having a face;
 each plate including a series of projections extending outwardly therefrom,
 each of the projections having a corresponding cavity defined on the opposite side thereof in the face of the respective plate, the cavities of the first plate being dissimilar in shape from the cavities of the second plate;
the projections on the first plate being discrete and spaced from one another in a distributed manner over the face of the first plate defining a region having a periphery such that the cavities on the face of the first plate form no continuous channel entirely within the plane of the first plate and linking one edge of the periphery of the region of the face of the first plate with another edge of the periphery of the region of the face of the first plate;
one or more cavities on the second plate forming at least one connecting passage between discrete and spaced apart cavities on the first plate;
bringing the first conductive plate and the second conductive plate into an overlapping relationship facing one another, engaging at least a subset of the cavities of the first plate with at least a subset of the cavities of the second plate, thereby providing at least one flow path between the first plate and the second plate; and
joining the first conductive plate and the second conductive plate.

11. The method of claim 10 including the step of forming the cavities of at least one plate using at least one of the processes of roller embossing, punching, hydroforming and eddy current embossing.

12. The method of claim 10 wherein the step of joining the first conductive plate and the second conductive plate is performed by one of soldering, bonding and laser welding.

13. An electrochemical system including: a first fuel cell, a second fuel cell and a bipolar plate; said bipolar plate being interposed between the first fuel cell and the second fuel cell;
the bipolar plate comprising: a first conductive plate having a face and defining a plane; and a second conductive plate having a face;
wherein each conductive plate includes a series of projections extending outwardly therefrom; wherein each of the projections have a corresponding cavity defined on the opposite side thereof in the face of the respective plate; and wherein the cavities of the first plate are dissimilar in shape from the cavities of the second plate, the cavities of the first plate forming no continuous channel within the first plate linking one edge of the plate with another edge of the plate;
wherein when the faces of the first and second plates are brought into an overlapping relationship facing each other, at least a subset of the cavities of the first plate engage a subset of the cavities of the second plate to provide at least one flow path between the first plate and the second plate;
wherein the projections of the first plate are discrete and spaced from one another in a distributed manner over the face of the first plate defining a region having a periphery such that the cavities on the face of the first plate form no continuous channel entirely within the plane of the first plate and linking one edge of the periphery of the region of the face of the first plate with another edge of the periphery of the region of the face of the first plate, the projections of the first plate defining a flow path for distributing a fuel medium on the anode side of the first fuel cell;
wherein one or more cavities on the second plate form at least one connecting passage between discrete and spaced apart cavities on the first plate; and
wherein the projections of the second plate define a flow path for distributing a medium on the cathode side of the second fuel cell.

14. The electrochemical system of claim 13 wherein the electrochemical system is a polymer electrolyte membrane system.

15. The electrochemical system of claim 13 wherein the second fuel cell is a self-breathing fuel cell.

16. The process of using a separator in an electrochemical system including the steps of: providing at least one separator having a first conductive plate having a face and defining a plane and a second conductive plate having a face;
each plate including a series of projections extending outwardly therefrom,
each of the projections having a corresponding cavity defined on the opposite side thereof in the face of the respective plate, wherein the cavities of the first plate are dissimilar in shape from the cavities of the second plate and, within the first plate, wherein the cavities on the first plate are discrete and spaced from one another in a distributed manner over the face of the first plate defining a region having a periphery, such that the cavities on the face of the first place form no continuous channel entirely within the plane of the first plate and linking one edge of the periphery of the region of the face of the first plate with another edge of the periphery of the region of the face of the first plate;
one or more cavities on the second plate forming at least one connecting passage between discrete and spaced apart cavities on the first plate; bringing the first conductive plate and the second conductive plate into an overlapping relationship facing one another, engaging at least a subset of the cavities of the first plate with at least a subset of the cavities of the second plate, thereby providing at least one flow path between the first plate and the second plate; and
joining the first conductive plate and the second conductive plate;
installing the at least one separator in an electrochemical system; and
providing a media on a first side of the separator and providing a media on a second side of the separator.

17. The process of claim 16 wherein the electrochemical system is a fuel cell.

18. The process of claim 17 wherein the fuel cell is a self breathing fuel cell.

19. The process of claim 16 wherein the electrochemical system is an electrochemical processor.

20. A separator for electrochemical systems, comprising:
a first conductive plate having a face; and
a second conductive plate having a face;
wherein each plate includes a series of projections extending outwardly therefrom; wherein each of the projections have a corresponding cavity defined on the opposite side thereof in the face of the respective plate;
wherein when the faces of the first and second plates are brought into an overlapping relationship facing one another, at least a subset of the cavities of the first plate engage a subset of the cavities of the second plate to provide at least one flow path between the first plate and the second plate;
wherein the cavities of the first plate are dissimilar in shape from the cavities of the second plate;
wherein the cavities on the first plate are discrete and spaced from one another in a distributed manner over the face of the first plate defining a region having a periphery, and within such that the cavities on the face of the first plate form no continuous channel linking one edge of the periphery of the region of the face of the first plate with another edge of the periphery of the region of the face of the first plate without the cavities on the second plate; and wherein the projections and corresponding cavities on the second plate form at least one connecting passage between discrete and spaced apart projections and corresponding cavities on the first plate.

* * * * *

UNITED STATES PATENT AND TRADEMARK OFFICE
CERTIFICATE OF CORRECTION

PATENT NO. : 8,088,535 B2
APPLICATION NO. : 10/594858
DATED : January 3, 2012
INVENTOR(S) : Stefan Sommer et al.

It is certified that error appears in the above-identified patent and that said Letters Patent is hereby corrected as shown below:

Column 1, line 56, replace "very" with --every--;
Column 3, line 46, replace "it" with --is--;
Column 9, line 2, replace "indicted" with --indicated--;
Column 12, Claim 16, line 21, replace "place" with --plate--.

Signed and Sealed this
First Day of May, 2012

David J. Kappos
*Director of the United States Patent and Trademark Office*